United States Patent
Bugge et al.

(10) Patent No.: US 9,118,597 B2
(45) Date of Patent: *Aug. 25, 2015

(54) METHOD AND SYSTEM FOR REQUESTER VIRTUAL CUT THROUGH

(71) Applicant: Oracle International Corporation, Redwood Shores, CA (US)

(72) Inventors: Haakon Ording Bugge, Oslo (NO); Lars Paul Huse, Oslo (NO); Ola Toerudbakken, Oslo (NO)

(73) Assignee: Oracle International Corporation, Redwood Shores, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/449,027

(22) Filed: Jul. 31, 2014

(65) Prior Publication Data

US 2014/0341229 A1 Nov. 20, 2014

Related U.S. Application Data

(63) Continuation of application No. 13/215,377, filed on Aug. 23, 2011, now Pat. No. 8,879,579.

(51) Int. Cl.
*H04L 29/04* (2006.01)
*H04L 12/805* (2013.01)
*H04L 12/64* (2006.01)

(52) U.S. Cl.
CPC .......... *H04L 47/365* (2013.01); *H04L 12/6418* (2013.01); *H04L 47/36* (2013.01)

(58) Field of Classification Search
CPC ............................ H04L 47/36; H04L 47/365

USPC .................................................. 370/470, 471
See application file for complete search history.

(56) References Cited

U.S. PATENT DOCUMENTS

| | | | |
|---|---|---|---|
| 6,459,698 | B1 | 10/2002 | Acharya |
| 6,563,790 | B1 | 5/2003 | Yu et al. |
| 6,741,559 | B1 | 5/2004 | Smeulders et al. |
| 6,789,143 | B2 | 9/2004 | Craddock et al. |
| 6,917,987 | B2 | 7/2005 | Parthasarathy et al. |
| 7,136,353 | B2 | 11/2006 | Ha et al. |
| 7,330,918 | B2 | 2/2008 | Yamamoto et al. |

(Continued)

OTHER PUBLICATIONS

Pfister, Gregory; "An Introduction to the Infiniband Architecture"; IBM Enterprise Server Group, Chapter 42, pp. 617-632 (2002).

(Continued)

*Primary Examiner* — Melvin Marcelo
(74) *Attorney, Agent, or Firm* — Osha Liang LLP

(57) ABSTRACT

A method for transmitting a message includes a communication adapter receiving, from a transmitting device, a request to send the message. The method further includes modifying a maximum transfer unit (MTU) to obtain a modified MTU, transmitting, from the communication adapter to a receiving system, a first sub-unit of the message using the modified MTU, iteratively increasing the MTU for transmitting intermediate sub-units of the message until an MTU limit is reached, and transmitting, to the receiving system, the intermediate sub-units of the message. The intermediate sub-units are transmitted after the first sub-unit and before a second sub-unit. The method further includes transmitting, from the communication adapter to the receiving system, the second sub-unit to the receiving system using a full path MTU.

11 Claims, 11 Drawing Sheets

(56) References Cited

U.S. PATENT DOCUMENTS

| | | |
|---|---|---|
| 7,496,698 B2 | 2/2009 | Biran et al. |
| 7,609,636 B1 | 10/2009 | Mott |
| 7,742,497 B2 | 6/2010 | Ganti et al. |
| 7,769,015 B2 | 8/2010 | Huang et al. |
| 7,782,805 B1 | 8/2010 | Belhadj et al. |
| 7,787,366 B2 | 8/2010 | Cuffaro et al. |
| 7,817,634 B2 | 10/2010 | Coffman et al. |
| 7,830,919 B1 | 11/2010 | Thompson |
| 7,899,050 B2 | 3/2011 | Craddock et al. |
| 8,244,946 B2 | 8/2012 | Gupta et al. |
| 8,255,475 B2 | 8/2012 | Kagan et al. |
| 8,259,576 B2 | 9/2012 | Lee et al. |
| 8,259,746 B2 | 9/2012 | Lo et al. |
| 8,274,976 B2 | 9/2012 | Aloni et al. |
| 8,284,802 B2 | 10/2012 | Huang et al. |
| 8,296,386 B1 | 10/2012 | Micalizzi, Jr. |
| 8,311,040 B2 | 11/2012 | Stanwood et al. |
| 2001/0036185 A1 | 11/2001 | Dempo |
| 2003/0101158 A1 | 5/2003 | Pinto et al. |
| 2005/0018669 A1 | 1/2005 | Arndt et al. |
| 2005/0060443 A1 | 3/2005 | Rosner |
| 2005/0135419 A1 | 6/2005 | Pullen et al. |
| 2005/0223118 A1 | 10/2005 | Tucker et al. |
| 2005/0232227 A1 | 10/2005 | Jorgenson et al. |
| 2007/0008886 A1 | 1/2007 | Chen et al. |
| 2007/0019665 A1 | 1/2007 | Benveniste |
| 2007/0165672 A1 | 7/2007 | Keels et al. |
| 2007/0223472 A1 | 9/2007 | Tachibana et al. |
| 2007/0223483 A1 | 9/2007 | Huang et al. |
| 2007/0242686 A1 | 10/2007 | Zegers et al. |
| 2008/0140984 A1 | 6/2008 | Shearer |
| 2008/0168194 A1 | 7/2008 | Gregg et al. |
| 2008/0259798 A1 | 10/2008 | Loh et al. |
| 2009/0125604 A1 | 5/2009 | Chang et al. |
| 2011/0216648 A1 | 9/2011 | Mehrotra et al. |
| 2012/0166582 A1 | 6/2012 | Binder |
| 2012/0239832 A1 | 9/2012 | Subramanian et al. |
| 2013/0051494 A1 | 2/2013 | Bugge et al. |

OTHER PUBLICATIONS

Shanley, Tom; "Infiniband Network Architecture", MindShare, Inc., Chapter 1, pp. 9-24 (2003).

Shanley, Tom; "Infiniband Network Architecture", MindShare, Inc., Chapters 3-6, pp. 31-129 (2003).

Shanley, Tom; "Infiniband Network Architecture", MindShare, Inc., Chapter 13, pp. 259-289 (2003).

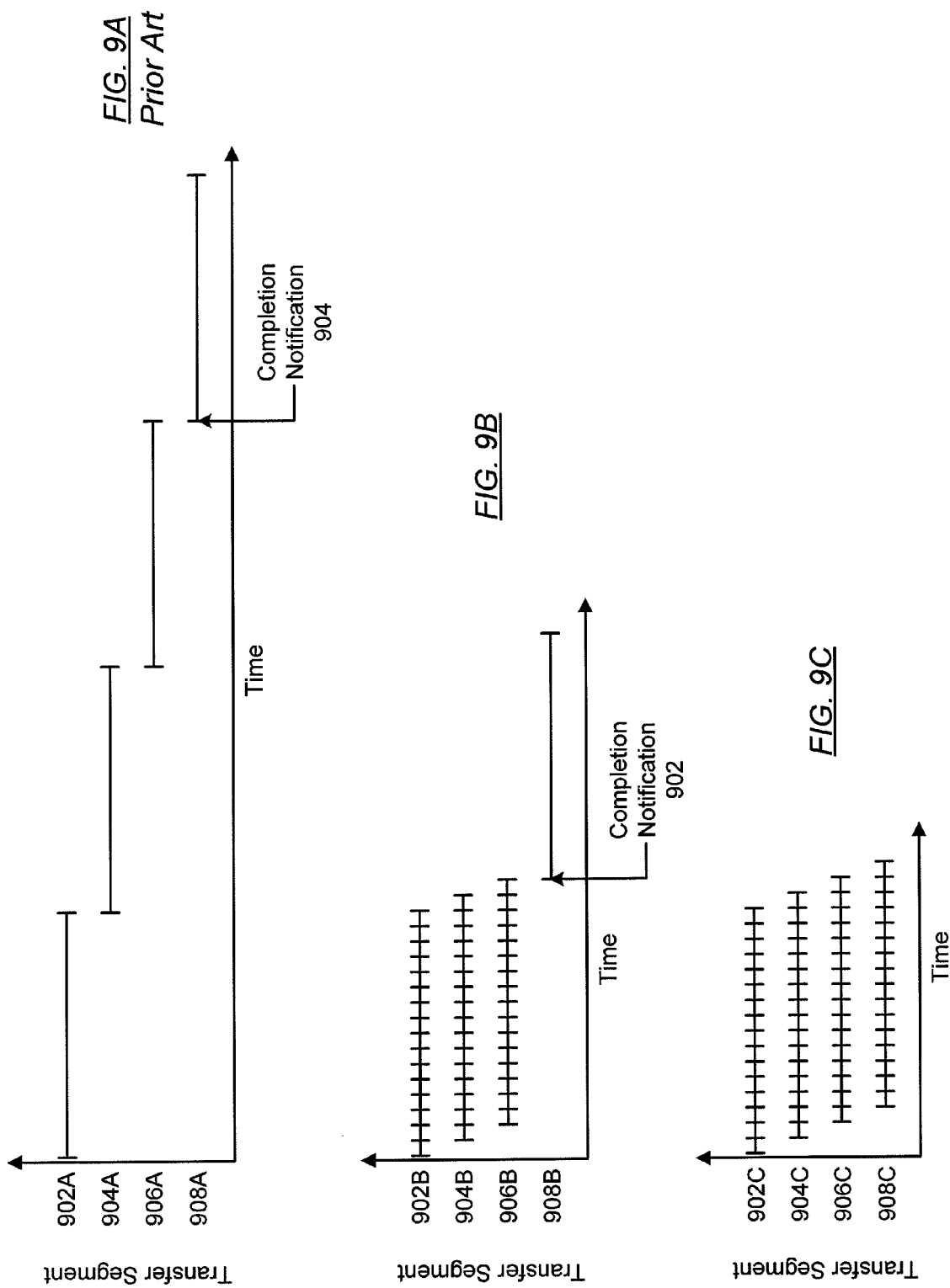

METHOD AND SYSTEM FOR REQUESTER VIRTUAL CUT THROUGH

CROSS-REFERENCE TO RELATED APPLICATIONS

This application is a continuation application of U.S. patent application Ser. No. 13/215,377 filed Aug. 23, 2011, and entitled "METHOD AND SYSTEM FOR REQUESTER VIRTUAL CUT THROUGH." Accordingly, this application claims benefit of U.S. patent application Ser. No. 13/215,377 under 35 U.S.C. §120. U.S. patent application Ser. No. 13/215,377 is hereby incorporated in its entirety.

BACKGROUND

Computer communications systems often transfer data in a unit. In order to achieve increased bandwidth, larger messages may be divided into sub-units called maximum transfer units ("MTUs"). Specifically, message is sent from a sending host to a sending network interface directly connected to the host. As the message is received on the sending network interface, the message is stored on the sending network interface. The message is sent in the MTUs from the sending network interface to a receiving network interface via a network. As the MTUs of the message are received on the receiving network interface, the MTUs are stored. Once the entire message is received on the receiving network interface, the entire message is transmitted to the receiving host. After the entire message is transmitted to the receiving host, the receiving network interface sends a notification to the host that the message arrived. This method may be referred to as a store and forward protocol because each component must store the message before the component can forward the message. The store and forward protocol may be used because of difference between the speed of an input/output (I/O) bus between the network interface and the host and the speed of the network. An additional or alternative reason for using the store and forward protocol is that the MTU may be different between the I/O bus and the network.

SUMMARY

In general, in one aspect, the invention relates to a method for transmitting a message. The method includes a communication adapter receiving, from a transmitting device, a request to send the message. The method further includes modifying a maximum transfer unit (MTU) to obtain a modified MTU, transmitting, from the communication adapter to a receiving system, a first sub-unit of the message using the modified MTU, iteratively increasing the MTU for transmitting intermediate sub-units of the message until an MTU limit is reached, and transmitting, to the receiving system, the intermediate sub-units of the message. The intermediate sub-units are transmitted after the first sub-unit and before a second sub-unit. The method further includes transmitting, from the communication adapter to the receiving system, the second sub-unit to the receiving system using a full path MTU.

In general, in one aspect, the invention relates to a communication adapter that includes a buffer configured to store a first sub-unit and a second sub-unit of a message, transmitting process logic operatively connected to the buffer, and a port. The transmitting processing logic is configured to receive, from a transmitting device, a request to send the message, modify a maximum transfer unit (MTU) to obtain a modified MTU, divide the message to obtain the first sub-unit based on the modified MTU, iteratively increase the MTU for transmitting intermediate sub-units of the message until an MTU limit is reached to obtain iteratively increased MTUs, and divide the message to obtain the intermediate sub-units using the iteratively increased MTUs. The port is configured to transmit, to a receiving system, the first sub-unit of the message using the modified MTU, transmit, to the receiving system, the intermediate sub-units of the message, and transmit, to the receiving system, the second sub-unit to the receiving system using a full path MTU. The intermediate sub-units are transmitted after the first sub-unit and before a second sub-unit.

In general, in one aspect, the invention relates to a non-transitory computer readable medium storing instructions for transmitting a message. The instructions include functionality to receive, from a transmitting device, a request to send the message, modify a maximum transfer unit (MTU) to obtain a modified MTU, transmit, to a receiving system, a first sub-unit of the message using the modified MTU, iteratively increase the MTU for transmitting intermediate sub-units of the message until an MTU limit is reached, and transmit, to the receiving system, the intermediate sub-units of the message. The intermediate sub-units are transmitted after the first sub-unit and before a second sub-unit. The instructions further include functionality to transmit, to the receiving system, the second sub-unit to the receiving system using a full path MTU.

Other aspects of the invention will be apparent from the following description and the appended claims.

DETAILED DESCRIPTION

Figure 1:
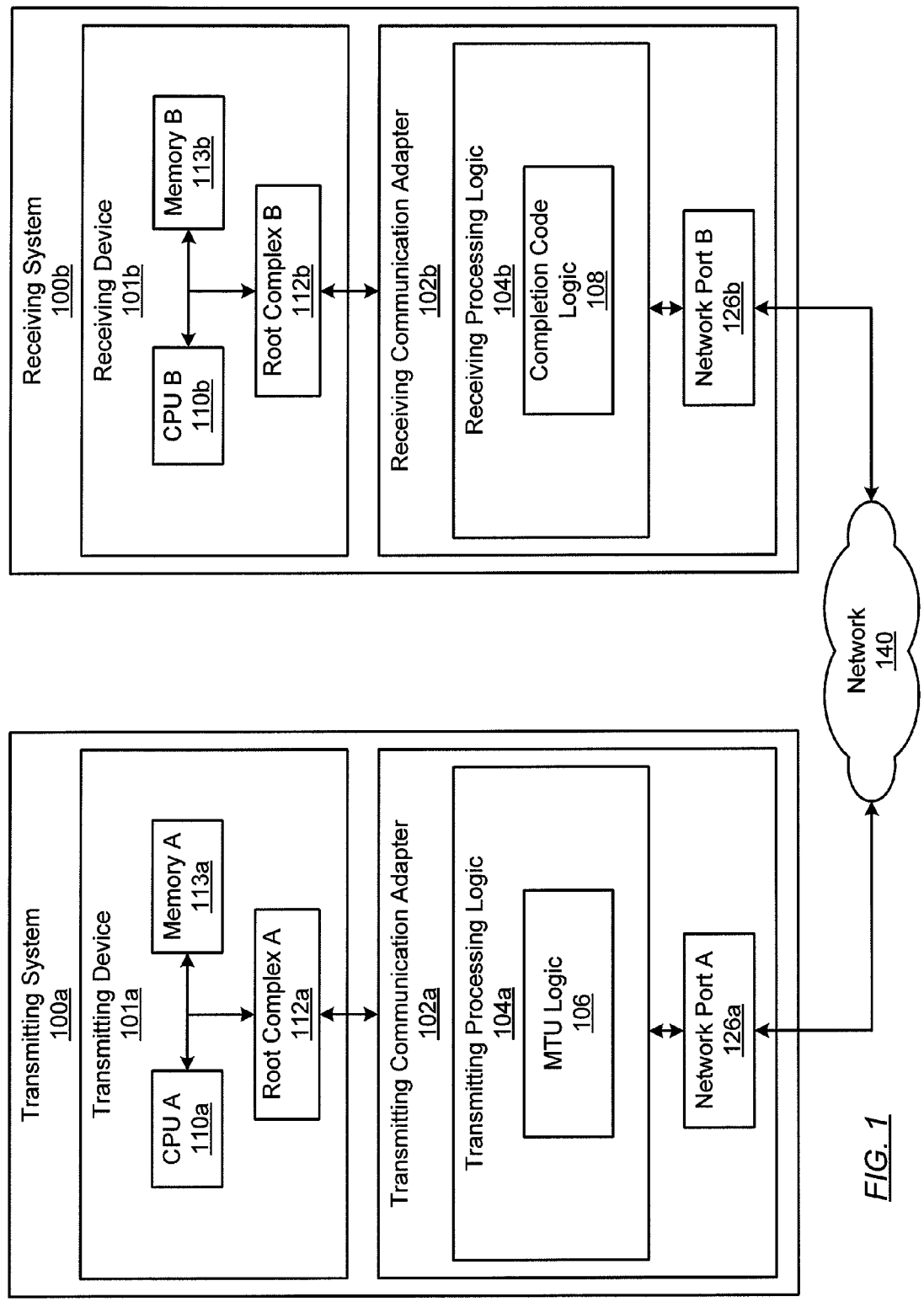
FIGS. 1-2 show schematic diagrams in one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and an apparatus for responder side cut through of received data. Specifically, embodiments of the invention use a modified maximum transfer unit ("MTU") to divide a message into sub-units. The sub-units are transmitted to a receiving system. On the receiving system, completions codes are appended to the sub-units, and forwarded to the receiving device. The completion codes allow the sub-units to be transmitted in parallel between the multiple transmission stages.

FIG. 1 shows a schematic diagram of a communication system in one or more embodiments of the invention. In one or more embodiments of the invention, the communication system includes a transmitting system (100a) and a receiving system (100b). The transmitting system (100a) and receiving system (100b) may be any type of physical computing device connected to a network (140). The network may be any type of network, such as an Infiniband® network, a local area network, a wide area network (e.g., Internet), or any other network now known or later developed. By way of an example of the transmitting system (100a) and the receiving system (100b), the transmitting system (100a) and/or a receiving system (100b) may be a host system, a storage device, or any other type of computing system. In one or more embodiments of the invention, for a particular message, the transmitting system (100a) is a system that sends the message and the receiving system (100b) is a system that receives the message. In other words, the use of the words, "transmitting" and "receiving", refer to the roles of the respective systems for a particular message. The roles may be reversed for another message, such as a response sent from receiving system (100b) to transmitting system (100b). For such a message, the receiving system (100b) is a transmitting system and the transmitting system (100a) is a receiving system. Thus, communication may be bi-directional in one or more embodiments of the invention.

In one or more embodiments of the invention, the transmitting system (100a) includes a device (e.g., transmitting device (101a), receiving device (101b)) and a communication adapter (e.g., transmitting communication adapter (102a), receiving communication adapter (102b)). The device and the communication adapter are discussed below.

In one or more embodiments of the invention, the device (e.g., transmitting device (101a), receiving device (101b)) includes at least a minimum amount of hardware necessary to process instructions. As shown in FIG. 1, the device includes hardware, such as a central processing unit ("CPU") (e.g., CPU A (110a), CPU B (110b)), memory (e.g., memory A (113a), memory B (113b)), and a root complex (e.g., root complex A (112a), root complex B (112b)). In one or more embodiments of the invention, the CPU is a hardware processor component for processing instructions of the device. The CPU may include multiple hardware processors. Alternatively or additionally, each hardware processor may include multiple processing cores in one or more embodiments of the invention. In general, the CPU is any physical component configured to execute instructions on the device.

In one or more embodiments of the invention, the memory is any type of physical hardware component for storage of data. In one or more embodiments of the invention, the memory may be partitioned into separate spaces for virtual machines In one or more embodiments, the memory further includes a payload for transmitting on the network (140) or received from the network (140) and consumed by the CPU.

Continuing with FIG. 1, in one or more embodiments of the invention, the communication adapter (e.g., transmitting communication adapter (102a), receiving communication adapter (102b)) is a physical hardware component configured to connect the corresponding device to the network (140). Specifically, the communication adapter is a hardware interface component between the corresponding device and the network. In one or more embodiments of the invention, the communication adapter is connected to the corresponding device using a peripheral component interconnect (PCI) express connection or another connection mechanism. For example, the communication adapter may correspond to a network interface card, an Infiniband® channel adapter (e.g., target channel adapter, host channel adapter), or any other interface component for connecting the device to the network. In one or more embodiments of the invention, the communication adapter includes logic (e.g., transmitting processing logic (104a), receiving processing logic (104b)) for performing the role of the communication adapter with respect to the message. Specifically, the transmitting communication adapter (102a) includes transmitting processing logic (104a) and the receiving communication adapter (102b) includes receiving processing logic (104b) in one or more embodiments of the invention. Although not shown in FIG. 1, the transmitting communication adapter (102a) and/or receiving communication adapter (102b) may also include receiving processing logic and transmitting processing logic, respectively, without departing from the scope of the invention. The transmitting processing logic (104a) and the receiving processing logic (104b) are discussed below.

In one or more embodiments of the invention, the transmitting processing logic (104a) is hardware or firmware that includes functionality to receive the payload from the transmitting device (101a), partition the payload into sub-units with header information, and transmit the sub-units via the network port (126a) on the network (140). By way of an example, the transmitting processing logic for an Infiniband® network is discussed in further detail in FIG. 2 below.

In one or more embodiments of the invention, the transmitting processing logic (104a) may include maximum transfer unit (MTU) logic (106). MTU logic (106) includes functionality to dynamically adjust the MTU size. By adjusting the MTU size, the MTU logic (106) includes functionality to dynamically adjust the size of each sub-unit. Thus, the sub-units of a single message may be different sizes in one or more embodiments of the invention.

Continuing with FIG. 1, in one or more embodiments of the invention, the receiving processing logic (104b) is hardware or firmware that includes functionality to receive the sub-units via the network (140) and the network port (126b) from the transmitting system (100a) and forward the sub-units to the receiving device (101b). The receiving processing logic (104b) may receive and store all sub-units before forwarding the message to the receiving device (101b). Alternatively, the receiving processing logic (104b) may transmit sub-units to the receiving device (101b) as sub-units are being received. By way of an example, the receiving processing logic for an Infiniband® network is discussed in further detail in FIG. 2 below.

In one or more embodiments of the invention, the receiving processing logic (104b) may include completion code logic (108). In one or more embodiments of the invention, completion code logic (108) is hardware and/or firmware configured to append a completion code to the received sub-units. A completion code is a unique identifier for the particular sub-unit with respect to the message. For example, the completion code may be a unique sequence number ("USN") or a cyclic redundancy codes ("CRC"). In one or more embodiments of the invention, if the completion code logic is a unique sequence number, subsequent consecutive sub-units are appended with subsequent consecutive USN. In one or more embodiments of the invention, a CRC is a calculated checksum for the sub-unit. Specifically, the completion code logic (108) may include a CRC generator that includes functionality to calculate the CRC using the USN as a seed value.

Although not shown in FIG. 1, the transmitting device (101a) and/or receiving device (101b) may include software, such as operating system(s), virtual machine manager(s), application(s), or any other type of software. Further, although not shown in FIG. 1, the receiving device (101b) includes a receiving entity (not shown). The receiving entity may be firmware, software, and/or hardware on the network that receives and processes the message. Specifically, the receiving entity is a component that includes functionality to perform the final processing of the message. For example, the receiving entity may correspond to a hardware component of the receiving device (101b), an application executing on the CPU (110b) or any other receiver of the message. Further, the receiving entity includes functionality to determine, for each subsequent sub-unit, whether the subsequent sub-unit was completely received.

Figure 2:
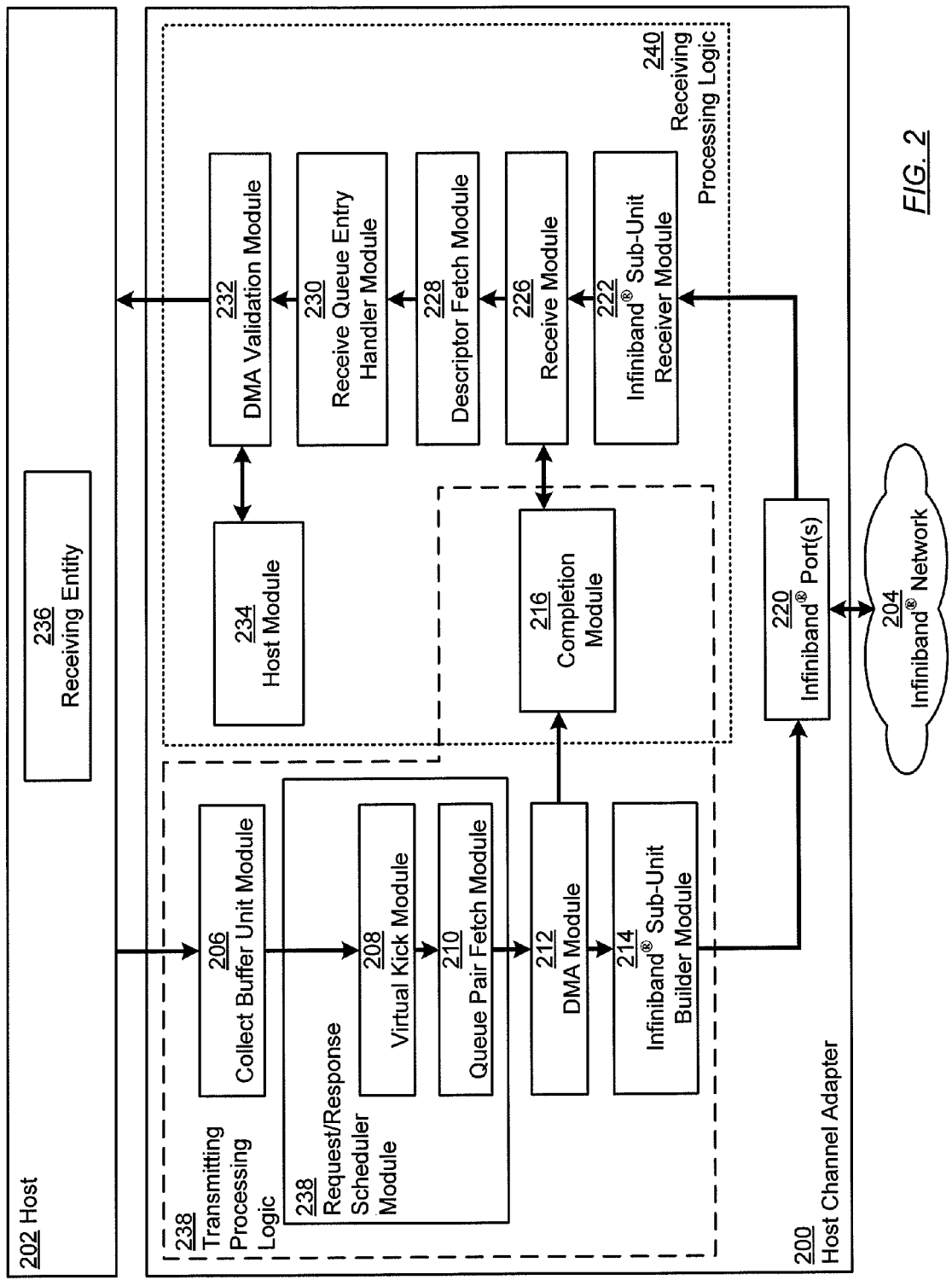

As discussed above, FIG. 1 shows a communication system for transmitting and receiving messages. FIG. 2 shows a schematic diagram of a communication adapter when communication adapter is a host channel adapter (200) and the network is an Infiniband® network in one or more embodiments of the invention.

As shown in FIG. 2, the host channel adapter (200) may include a collect buffer unit module (206), a request/response scheduler module (238), a direct memory access (DMA) module (212), an Infiniband® sub-unit builder module (214), one or more Infiniband® ports (220), a completion module (216), an Infiniband® sub-unit receiver module (222), a receive module (226), a descriptor fetch module (228), a receive queue entry handler module (230), a DMA validation module (232), and a host module (234). In the host channel adapter of FIG. 2, the host channel adapter includes both transmitting processing logic (238) for sending messages on the Infiniband® network (204) and receiving processing logic (240) for receiving messages from the Infiniband® network (204). In one or more embodiments of the invention, the collect buffer unit module (206), request/response scheduler module (238), direct memory access (DMA) module (212), Infiniband® sub-unit builder module (214), and completion module (216) may be components of the transmitting processing logic (238). The completion module (216), Infiniband® sub-unit receiver module (222), receive module (226), descriptor fetch module (228), receive queue entry handler module (230), DMA validation module (232), and host module (234) may be components of the receiving processing logic (240). As shown, the completion module (216) may be considered a component of both the transmitting processing logic (238) and the receiving processing logic (240) in one or more embodiments of the invention.

In one or more embodiments of the invention, each module may correspond to hardware and/or firmware. Each module is configured to process data units. Each data unit corresponds to a command or a received message or sub-unit. For example, a data unit may be the command, an address of a location on the communication adapter storing the command, a portion of a message corresponding to the command, a sub-unit, an identifier of a sub-unit, or any other identifier corresponding to a command, a portion of a command, a message, or a portion of a message.

The dark arrows between modules show the transmission path of data units between modules as part of processing commands and received messages in one or more embodiments of the invention. Data units may have other transmission paths (not shown) without departing from the invention. Further, other communication channels and/or additional components of the host channel adapter (200) may exist without departing from the invention. Each of the components of the resource pool is discussed below.

The collect buffer controller module (206) includes functionality to receive command data from the host and store the command data on the host channel adapter. Specifically, the collect buffer controller module (206) is connected to the host and configured to receive the command from the host and store the command in a buffer. When the command is received, the collect buffer controller module is configured to issue a kick that indicates that the command is received.

In one or more embodiments of the invention, the request/response scheduler module (238) includes functionality to dynamically adjust the MTU. Specifically, the request/response scheduler module may include functionality to perform at least a portion of the Steps discussed below with reference to FIGS. 3-5. In one or more embodiments of the invention, the request/response scheduler module (238) includes a virtual kick module (208) and a queue pair fetch module (210).

In one or more embodiments of the invention, the virtual kick module (208) includes functionality to load balance commands received from applications. Specifically, the virtual kick module is configured to initiate execution of commands through the remainder of the transmitting processing logic (238) in accordance with a load balancing protocol.

In one or more embodiments of the invention, the queue pair fetch module (210) includes functionality to obtain queue pair status information for the queue pair corresponding to the data unit. Specifically, per the Infiniband® protocol, the message has a corresponding send queue and a receive queue. The send queue and receive queue form a queue pair. Accordingly, the queue pair corresponding to the message is the queue pair corresponding to the data unit in one or more embodiments of the invention. The queue pair state information may include, for example, sequence number, address of remote receive queue/send queue, whether the queue pair is allowed to send or allowed to receive, and other state information.

In one or more embodiments of the invention, the DMA module (212) includes functionality to perform DMA with host memory. The DMA module may include functionality to determine whether a command in a data unit or referenced by a data unit identifies a location in host memory that includes payload. The DMA module may further include functionality to validate that the process sending the command has necessary permissions to access the location, and to obtain the payload from the host memory, and store the payload in the DMA memory. Specifically, the DMA memory corresponds to a storage unit for storing a payload obtained using DMA.

Continuing with FIG. 2, in one or more embodiments of the invention, the DMA module (212) is connected to an Infiniband® sub-unit builder module (214). In one or more embodiments of the invention, the Infiniband® sub-unit builder module includes functionality to generate one or more sub-units for each data unit and to initiate transmission of the one or more sub-units on the Infiniband® network (204) via the Infiniband® port(s) (220). In the process of generating the sub-units, the Infiniband® sub-unit builder module may include functionality to dynamically adjust the MTU, and divide the message into sub-units according to the dynamically adjusted MTU. In one or more embodiments of the invention, the Infiniband® sub-unit builder module may include functionality to obtain the payload from a buffer corresponding to the data unit, from the host memory, and from an embedded processor subsystem memory.

In one or more embodiments of the invention, the completion module (216) includes functionality to manage sub-units for queue pairs set in reliable transmission mode. Specifically, in one or more embodiments of the invention, when a queue pair is in a reliable transmission mode, then the receiving channel adapter of a new sub-unit responds to the new sub-unit with an acknowledgement message indicating that transmission completed or an error message indicating that transmission failed. The completion module (216) includes functionality to manage data units corresponding to sub-units until an acknowledgement is received or transmission is deemed to have failed (e.g., by a timeout).

In one or more embodiments of the invention, the Infiniband® sub-unit receiver module (222) includes functionality to receive sub-units from the Infiniband® port(s) (220). In one or more embodiments of the invention, the Infiniband® sub-unit receiver module (222) includes functionality to perform a checksum to verify that the sub-unit is correct, parse the headers of the received sub-units, and place the payload of the sub-unit in memory. In one or more embodiments of the invention, the Infiniband® sub-unit receiver module (222) includes functionality to obtain the queue pair state for each sub-unit from a queue pair state cache. In one or more embodiments of the invention, the Infiniband® sub-unit receiver module includes functionality to transmit a data unit for each sub-unit to the receive module (226) for further processing.

In one or more embodiments of the invention, the receive module (226) includes functionality to validate the queue pair state obtained for the sub-unit. The receive module (226) includes functionality to determine whether the sub-unit should be accepted for processing. In one or more embodiments of the invention, if the sub-unit corresponds to an acknowledgement or an error message for a sub-unit sent by the host channel adapter (200), the receive module includes functionality to update the completion module (216).

Additionally or alternatively, the receive module (226) includes a queue that includes functionality to store data units waiting for one or more reference to buffer location(s) or waiting for transmission to a next module. Specifically, when a process in a virtual machine is waiting for data associated with a queue pair, the process may create receive queue entries that reference one or more buffer locations in host memory in one or more embodiments of the invention. For each data unit in the receive module hardware linked list queue, the receive module includes functionality to identify the receive queue entries from a host channel adapter cache or from host memory, and associate the identifiers of the receive queue entries with the data unit.

In one or more embodiments of the invention, the descriptor fetch module (228) includes functionality to obtain descriptors for processing a data unit. For example, the descriptor fetch module may include functionality to obtain descriptors for a receive queue, a shared receive queue, a ring buffer, and the completion queue.

In one or more embodiments of the invention, the receive queue entry handler module (230) includes functionality to obtain the contents of the receive queue entries. In one or more embodiments of the invention, the receive queue entry handler module (230) includes functionality to identify the location of the receive queue entry corresponding to the data unit and obtain the buffer references in the receive queue entry. In one or more embodiments of the invention, the receive queue entry may be located on a cache of the host channel adapter (200) or in host memory.

In one or more embodiments of the invention, the DMA validation module (232) includes functionality to perform DMA validation and initiate DMA between the host channel adapter and the host memory. The DMA validation module includes functionality to confirm that the remote process that sent the sub-unit has permission to write to the buffer(s) referenced by the buffer references, and confirm that the address and the size of the buffer(s) match the address and size of the memory region referenced in the sub-unit. Further, in one or more embodiments of the invention, the DMA validation module (232) includes functionality to initiate DMA with host memory when the DMA is validated.

In one or more embodiments of the invention, the host module (234) includes functionality to obtain a completion code for a received sub-unit and append the completion code to the received sub-unit. For example, the host module (234) may include functionality to identify a subsequent USN and append the subsequent USN on the received sub-unit before or while storing the sub-unit in memory (not shown) on the host (202). As another example, the host module may include functionality to identify a subsequent USN, generate a CRC from the sub-unit using the subsequent USN as a seed value, and append the subsequent CRC on the received sub-unit before or while storing the sub-unit in memory (not shown) on the host (202).

Continuing with FIG. 2, the host (202) includes a receiving entity (236). As discussed above with reference to FIG. 1, the receiving entity is hardware, software, and/or firmware that includes functionality to perform final processing of the message. The receiving entity (236) includes functionality to obtain the completion code appended to a sub-unit in host memory and determine, based on the completion code whether the sub-unit is completely received and whether the sub-unit is the next sub-unit to process.

FIGS. 3-7 show flowcharts of a method for modifying the MTU in accordance with one or more embodiments of the invention. While the various steps in these flowcharts are presented and described sequentially, some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, additional steps, omitted in FIGS. 3-7, may be included in performing this method. Accordingly, the specific arrangement of steps shown in FIGS. 3-7 should not be construed as limiting the invention.

Figure 3:
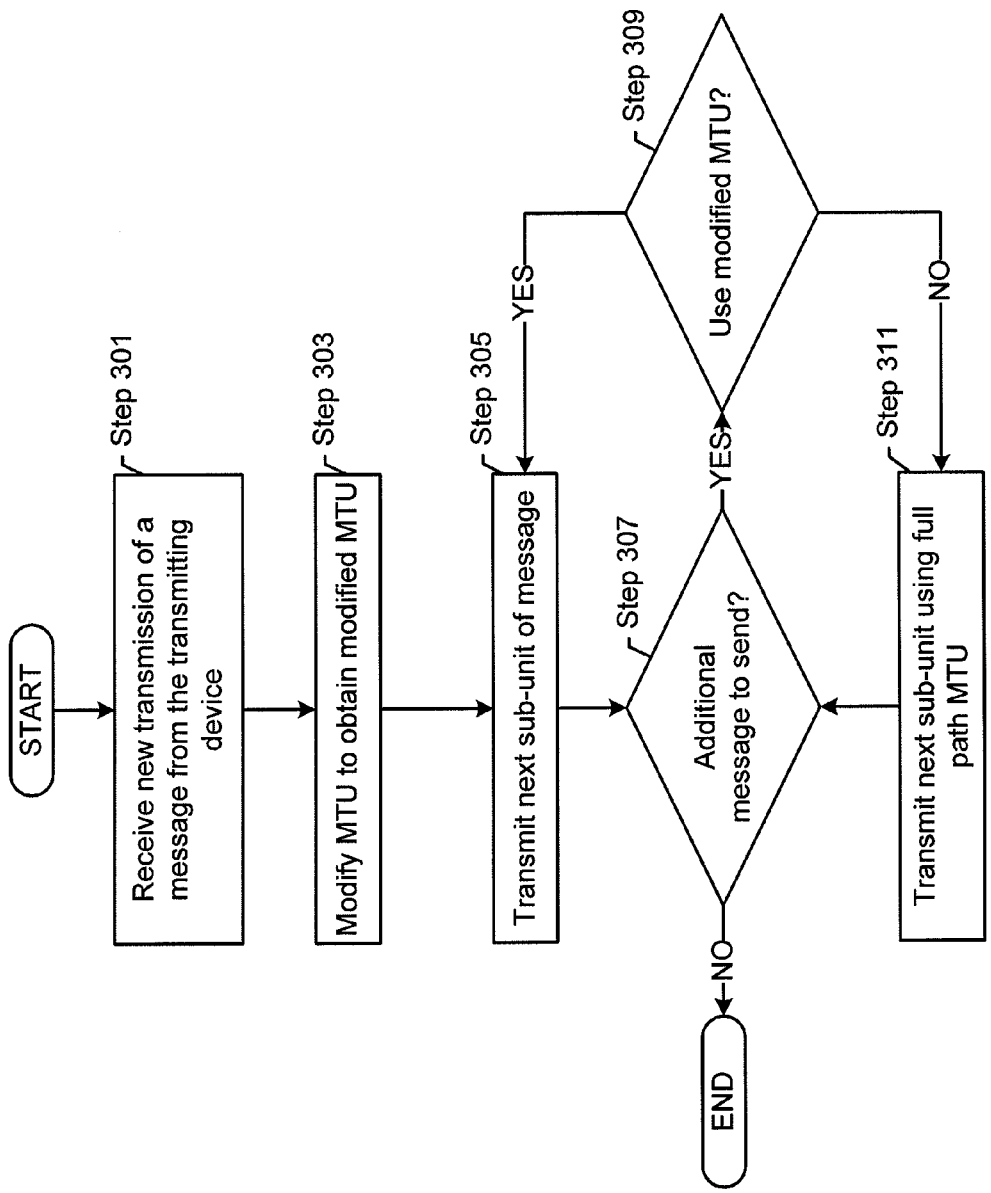
FIGS. 3-7 show flowcharts in one or more embodiments of the invention.

FIG. 3 shows a flowchart of a method for dynamically adjusting MTU during transmission of a message. In Step 301, a request to transfer a message is received from the transmitting device. Specifically, the transmitting device sends a request to the communication adapter. The request may include at least a portion of the message or an instruction to obtain the payload of the message from memory on the transmitting device. For example, if the communication adapter is a host channel adapter, the collect buffer module may receive command data from the host instructing the host to send a message to the remote host channel adapter. In one or more embodiments of the invention, the command data is received as a write to a virtual collect buffer. The command data is stored in a physical collect buffer bound to the virtual collect buffer. Once the entire command data is received, a kick is issued and the command is processed through the remaining transmitting logic. As part of processing the command, direct memory access may be performed to obtain the message from host memory. As the payload of the message is being received, the message is stored on the host channel adapter for transmission on the network.

In Step 303, the MTU is modified to obtain a modified MTU. For example, the transmitting processing logic of FIG. 1 may configure the MTU to correspond to the communication channel. Further, the modified MTU may be set on a per message basis. If the modified MTU is set on a per message basis, the communication adapter is also associated with a full path MTU that is greater than the modified MTU. The full path MTU is the minimal MTU supported by all port and switches along a path from a transmitting system to a receiving system.

In Step 305, the next sub-unit of the message is transmitted to the receiving system using the modified MTU. Specifically, the sub-unit may be determined based on the maximum size specified by the modified MTU and then transmitted by the transmitting communication adapter to the receiving system over the network. In one or more embodiments of the invention, when the sub-unit is transmitted, the sub-unit is encoded with the modified MTU. In other words, the sub-unit includes an identifier of the size of the sub-unit. Thus, the receiving system may determine the MTU of the sub-unit being transmitted. The MTU may be encoded in a sub-unit in stateful ingress filtering ("PSIF") to PSIF communications, where sub-units are filtered to determine their origin. In this case, the PSIF is used to determine the MTU of the sub-units as they are received so that the sub-units may be properly processed by the communication adapter of the receiving system.

In Step 307, a determination is made as to whether there are additional sub-units of the message to send. If there are no additional sub-units to send, the process ends. If there are additional sub-units to send, a determination is made as to whether the modified MTU should be used (Step 309). For example, the communication adapter may be configured to select the modified MTU to reduce latency, where the modified MTU is a reduced MTU such as 256 bytes. In this example, the latency may be reduced as discussed below with respect to example FIGS. 9B and 9C. In another example, the communication adapter may be configured to select the full path MTU in order to reduce the number of sub-units (sub-unit headers) required to transmit the message, thereby decreasing amount of bandwidth used.

In one or more embodiments of the invention, the communication adapter may be configured to select either the modified MTU or the full path MTU to optimize the transmission of messages. For example, the communication adapter may choose to use the full path MTU for larger messages, where higher throughput is desired. In another example, the communication adapter may choose to use a reduced MTU for small or medium size messages that would benefit greatly from the reduced latency.

If the communication adapter determines that the modified MTU should be used, then the process proceeds to Step 305. If the communication adapter determines that the modified MTU should not be used, the process proceeds to Step 311. In Step 311, the next sub-unit of the message is transmitted using the full path MTU before proceeding to Step 307 to process any additional sub-units of the message that may remain.

Figure 4:
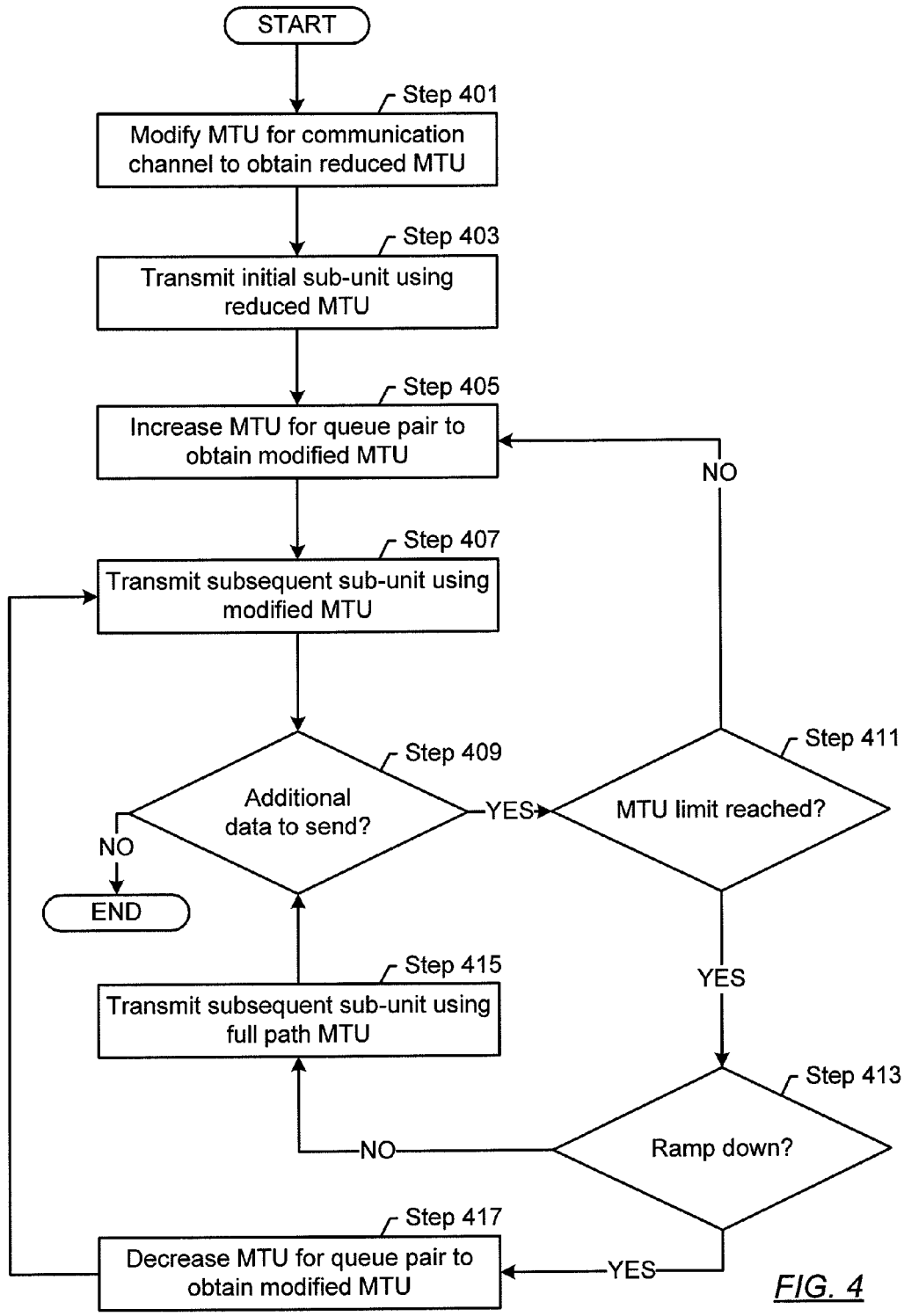

FIG. 4 shows a flowchart of a method for ramping up and, optionally, ramping down MTU during transmission of a message. Examples of ramping up and ramping down MTU are described below with respect to FIGS. 9D and 9E. In Step 401, the MTU for a communication channel of a communication adapter is modified to obtain a reduced MTU. For example, transmitting processing logic as discussed above with respect to FIG. 1 may configure the MTU of the communication adapter. The reduced MTU may be set for the communication channel on a per message (i.e., request) basis. In this case, the communication adapter is also associated with a full path MTU that is greater than the modified MTU. For example, the reduced MTU may be 256 bytes and the full path MTU may be 2 kilobytes.

In Step 403, an initial sub-unit of the message is transmitted using the reduced MTU. Specifically, the reduced MTU may be used to divide the message into an initial sub-unit and a remaining portion of the message. The initial sub-unit may then be transmitted by the transmitting channel adapter to the network. Because the reduced MTU is smaller than the full path MTU, the transmission of the initial sub-unit has reduced latency.

In Step 405, the MTU for the communication channel is increased to obtain a modified MTU. The MTU may be increased incrementally or proportionally. For example, the MTU may be increased proportionally using a fraction with a denominator that is a power of two (e.g., 5/4). In this example, the increased modified MTU should be rounded to the nearest factor of 64 to ensure the modified MTU is an appropriate byte size for generating a sub-unit.

In Step 407, a subsequent sub-unit is transmitted using the modified MTU. Specifically, the modified MTU may be used to divide the message into a subsequent sub-unit and a remaining portion of the message. The subsequent sub-unit may then be transmitted by the transmitting communication adapter to the network. Because the modified MTU is larger than the previous MTU, the transmission of the subsequent sub-unit has increased latency but has also increased throughput.

In Step 409, a determination is made as to whether there is additional data to send. If there are no additional sub-units to send, the process ends. If there are additional sub-units to send, a determination is made as to whether the MTU limit is reached (Step 411). The MTU is the maximum packet payload size. In one or more embodiments of the invention, the MTU limit is the lesser of the port MTU capacity and path MTU. The port MTU is the largest MTU that the port can send. The path MTU is the largest MTU that can be used on a route from a source to a destination. For example, the MTU limit may be the full path MTU of the communication adapter. If the MTU limit is not reached, the workflow proceeds to Step 405. In other words, the MTU is iteratively increased in Steps 405-411 until the MTU limit is reached, effectively ramping up the MTU until the limit is reached. As the MTU ramps up, both the network latency and throughput of the transmissions increase. Once the limit is reached, the workflow proceeds to Step 413.

Optionally, in Step 413, a determination is made as to whether the MTU should be ramped down. When the limit MTU is reached, the limit MTU may be maintained for transmissions to optimize for increased throughput (Step 415). It may be determined that the MTU should be ramped down as the end of the message is approached. For example, ramping down may be configured to occur when the remainder of the message is less than twice the MTU limit. If it is determined that the MTU should be ramped down, the workflow proceeds to Step 417.

In Step 417, the MTU is decreased to obtain the modified MTU.

Specifically, the modified MTU may be decreased to be a fraction of the remainder of the message. For example, the reduced MTU may be configured to send half of the remainder of the message. In this case, the MTU is iteratively reduced in Steps 409-417, effectively ramping down the MTU. The MTU may be reduced until a cutoff amount is reached. Once the remainder of the message is less than the cutoff amount, the remainder is transmitted and the transmission of the message is complete.

Figure 5:
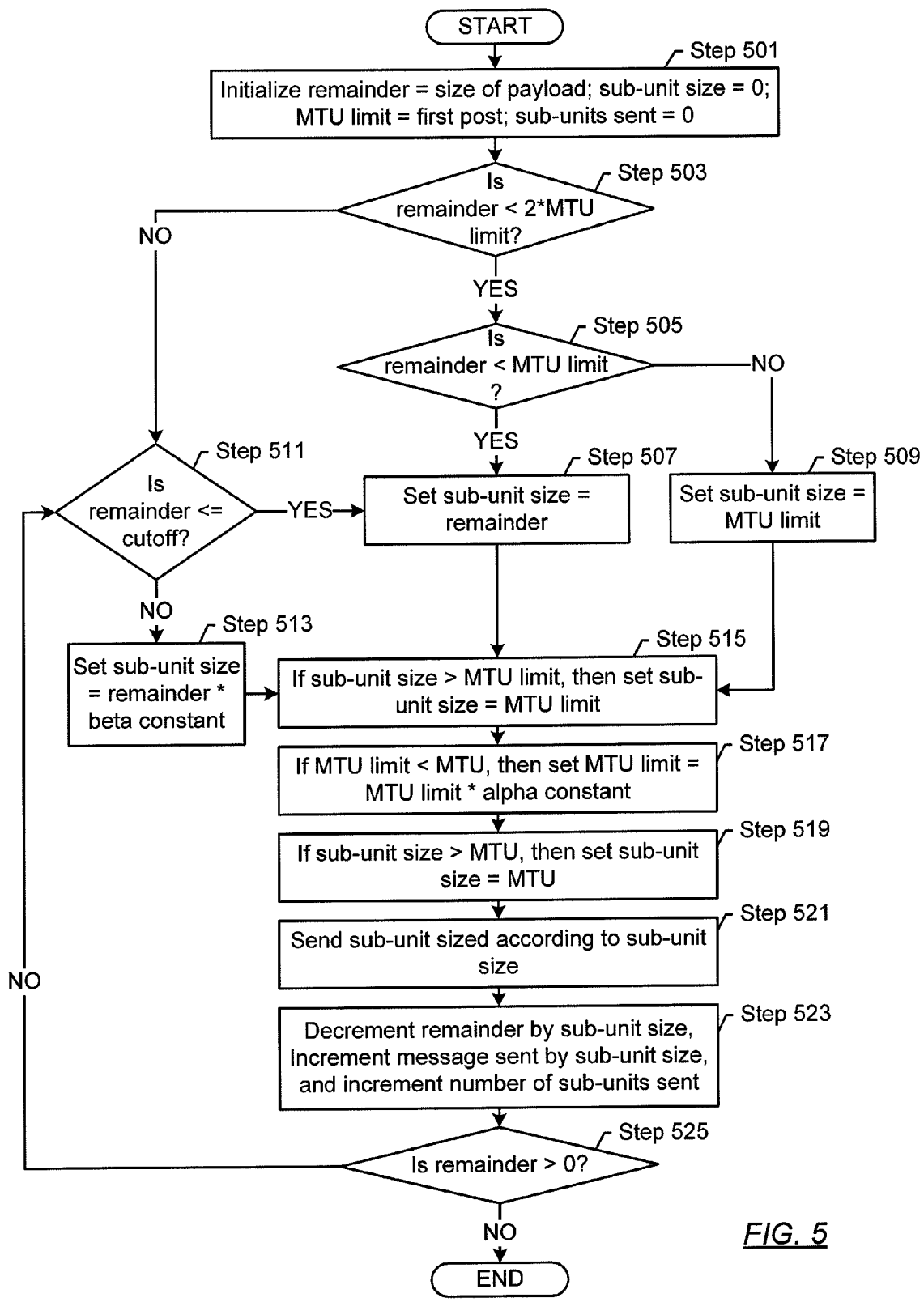

FIG. 5 shows a more detailed flowchart of the workflow described above with reference to FIG. 4. In FIG. 5, alpha constant is a fraction that is greater than one and beta constant is a fraction that is less than one. For example, the alpha constant may be 5/4 while the beta constant is 1/2. In one or more embodiments of the invention, the alpha constant and the beta constant each have a denominator that is a power of two. Alpha constant is used to ramp up the MTU as discussed above in Steps 405-411, and beta constant is used to ramp down the MTU as discussed above in Steps 409-417. For the other constraints in FIG. 5, an example cutoff is 128 bytes and an example first post is 256 bytes. For example, the 256 bytes may be used for the first post when the header includes a global route header. Further, the remainder in FIG. 5 is a variable storing the remaining amount of the message to be sent, the sub-unit size is a variable storing the number of bytes that the sub-unit should be, and the sub-units sent is a variable storing a number of sub-units that have been transmitted on the network.

In Step 501, a remainder is initialized to the size of the payload, the sub-unit size and the sub-units sent are initialized to zero and the MTU limit is initialized to first post value in one or more embodiments of the invention. In Step 503, a determination is made whether the remainder is less than two times the MTU limit. Specifically, a determination is made whether the size of the message yet to be sent is less than the MTU limit multiplied by two. In Step 505, if the remainder is less than two times the MTU limit, then a determination is made whether the remainder is less than the MTU limit.

In Step 507, if the remainder is less than the MTU limit, then the sub-unit size is equal to the remainder. If the remainder is not less than or equal to the MTU limit, then the sub-unit size is set as the MTU limit.

Returning to Step 503, if a determination is made that the remainder is not less than twice the MTU limit, than a determination is made whether the remainder is less than or equal to the cutoff in Step 511 in one or more embodiments of the invention. If the remainder is less than or equal to the cutoff, then the sub-unit size is set as equal to the remainder in Step 507 in one or more embodiments of the invention. Alternatively, if the remainder is not less than or equal to the cutoff, then the sub-unit size is set as the remainder multiplied by the beta constant in Step 513. As discussed above, the beta constant is less than one in one or more embodiments of the invention and is used to ramp down the sub-unit size.

Continuing with FIG. 5, in Step 515, if the sub-unit size is greater than the MTU limit, then the sub-unit size is set as equal to the MTU limit in one or more embodiments of the invention. Further, in Step 517, if the MTU limit is less than the MTU, then the MTU limit is multiplied by the alpha constant to obtain a result and the result is stored in the MTU limit. As discussed above, the alpha constant may be used to ramp up the MTU limit. In Step 519, if the sub-unit size is greater than the MTU, then the sub-unit size is set as equal to the MTU in one or more embodiments of the invention.

In Step 521, a sub-unit sized according to the sub-unit size is sent in one or more embodiments of the invention. Specifically, the next set of bytes of the message are added to a sub-unit and sent on the network. The number of bytes in the next set of bytes corresponds to the sub-unit size.

In Step 523, the remainder is decremented by the sub-unit size, the message sent is incremented by the sub-unit size, and the number of sub-units sent is incremented by one in one or more embodiments of the invention. Further, in Step 525, a determination is made whether the remainder is greater than zero. If the reminder is greater than zero, then the workflow repeats to process the remaining portion of the message. Alternatively, the message is completely sent and the workflow ends.

Figure 6:
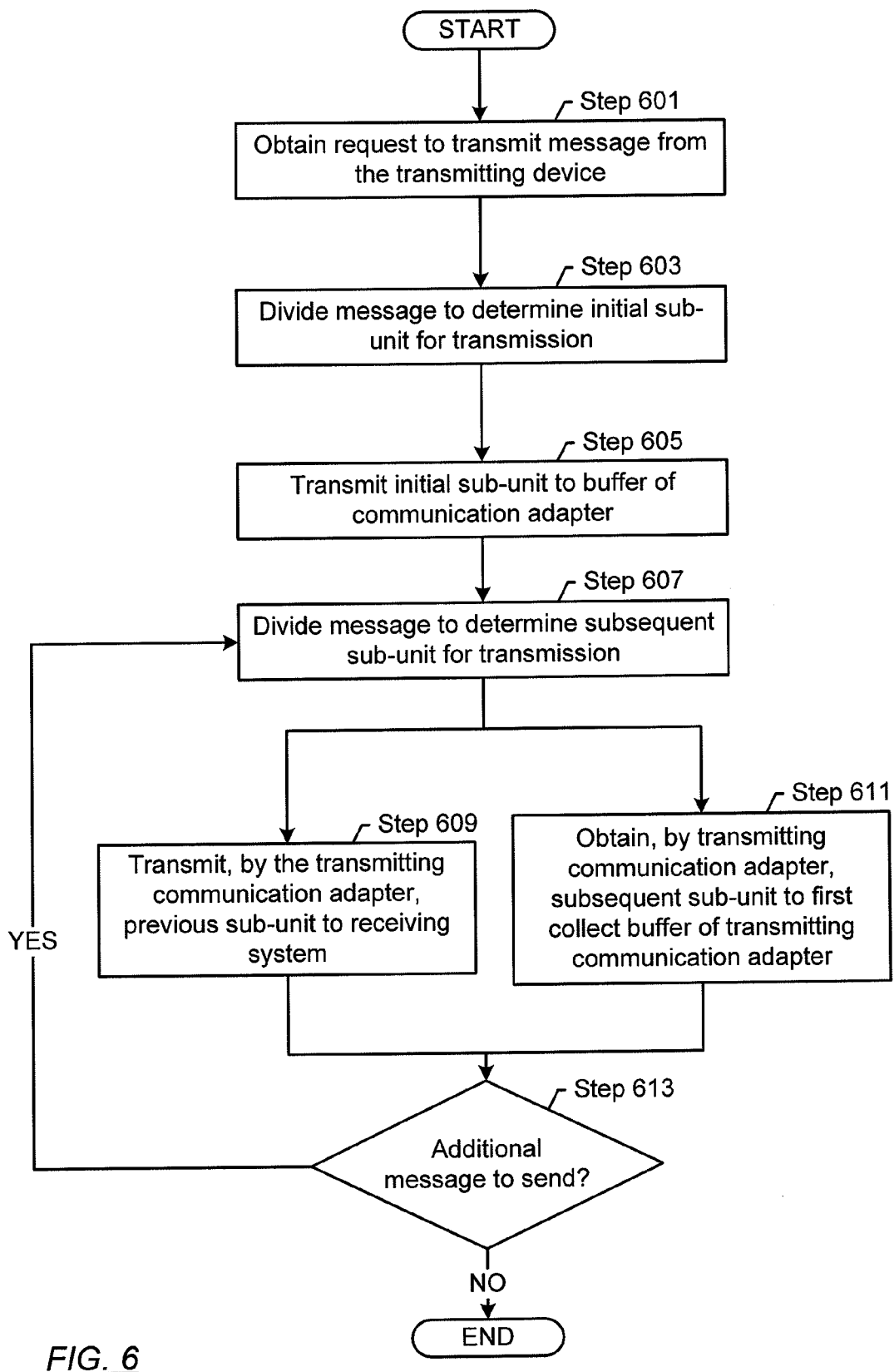

FIG. 6 shows a flowchart of a method for transmitting a message from the perspective of the transmitting communication adapter. In Step 601, a request to transmit the message is obtained from the transmitting device in one or more embodiments of the invention. In one or more embodiments of the invention, the communication adapter begins processing the request.

In Step 603, the message is divided to determine an initial sub-unit for transmission. Dividing the message may be performed as discussed above in FIGS. 4 and 5. The initial sub-unit is transmitted to a buffer on the communication adapter in Step 605. Specifically, the initial sub-unit may be transmitted from the memory to the buffer via a root complex as discussed above with respect to FIG. 1. The initial sub-unit is transmitted to the buffer in preparation for a transmission of the initial sub-unit over the network. In Step 607, the message is divided to determine a subsequent sub-unit for transmission.

Once it is confirmed that the initial sub-unit is completely transmitted to the buffer, the workflow may proceed to perform Step 609 and 611 in parallel. Because the reduced MTU decreases the size of the sub-unit, the parallelization of transmissions may occur sooner, thereby reducing the overall transmission time as shown below in FIGS. 9B and 9C. In Step 609, the previous sub-unit (e.g., the initial sub-unit) is transmitted to the receiving system. While the previous sub-unit is being transmitted to the receiving system, the subsequent sub-unit is transmitted from the memory to the buffer of the transmitting communication adapter in parallel (Step 611).

In Step 613, a determination is made as to whether there are additional sub-units of the message to send. If there are no additional sub-units to send, the process ends. If there are additional sub-units to send, the workflow proceeds to repeat Steps 607-613 until all sub-units of the message have been transmitted. In this case, the communication adapter will continue to transmit subsequent sub-units to the buffer while transmitting previous sub-units to receiving systems in parallel.

Figure 7:
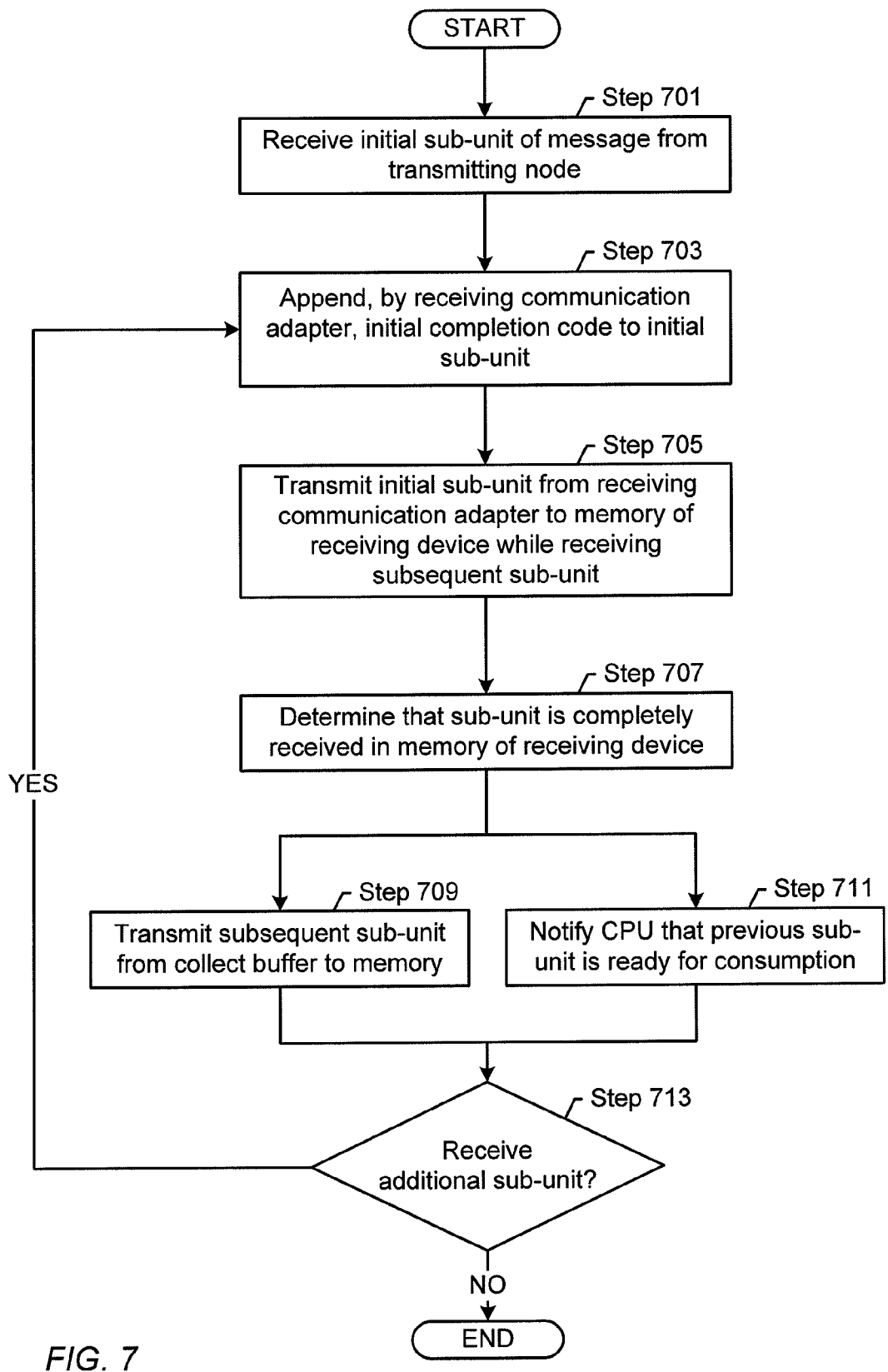

FIG. 7 shows a flowchart of a method for receiving a message from a prospective of the receiving communication adapter in one or more embodiments of the invention. In Step 701, the receiving communication adapter receives an initial sub-unit of a message is received. As discussed above, the sub-unit may be encoded with sub-unit is the modified MTU when the sub-unit is received by the receiving communication adapter. Thus, in one or more embodiments of the invention, the receiving communication adapter may use the encoding to determine when the entire sub-unit is received.

In Step 703, the receiving communication adapter appends an initial completion code to the initial sub-unit in one or more embodiments of the invention. For example, an initial USN may be appended to the initial sub-unit. The USN may be appended to the end of the sub-unit to specify the sequential order of the sub-units generated from the message. Optionally, rather than append a USN to each sub-unit, the USN may be used as an initial seed value for a CRC generation for each sub-unit. Specifically, the transmitting communication adapter may generate the CRC and append the CRC to the sub-unit. Generating the CRC may include calculating a short, fixed-length binary sequence for each block of data to be stored. By appending the CRC, the receiving entity may correctly determine when a write of data is out of order. As discussed above, either a USN or a CRC may be generically referred to as a completion code. In one or more embodiments of the invention, the CRC may be generated using the USN. In particular, the USN may be used as input to a function with or without a first, intermediate, or last value to modify an initial seed value, an intermediate result, or a final result of the CRC generator.

In one or more embodiments of the invention, the initial sub-unit may be transmitted from the buffer of the receiving communication adapter to memory of the receiving system in Step 705. While the initial sub-unit is being transmitted to the memory, a subsequent sub-unit is received from the transmitting communication adapter in parallel in one or more embodiments of the invention.

In Step 707, a determination is made that the sub-unit is completely transmitted to the memory of the receiving device. Once it is confirmed that the initial sub-unit is completely transmitted to the memory and, optionally, that the subsequent sub-unit is completely transmitted to the buffer on the communication adapter, the workflow may proceed to perform Step 709 and 711 in parallel. Because the reduced MTU decreases sub-unit size, the parallelization of transmissions may occur sooner, thereby reducing the overall transmission time as shown below in FIGS. 9B and 9C. In Step 709, the subsequent sub-unit is transmitted from the buffer to the memory. While the subsequent sub-unit is being transmitted to the memory, the receiving entity is notified that the previous sub-unit (e.g., initial sub-unit) is ready for consumption in Step 711. Thus, the receiving entity may then use the previous sub-unit in parallel (Step 711).

Before processing the sub-unit, the receiving entity may verify that the sub-unit is the next subsequent sub-unit using the completion code. In other words, completion code allows the receiving entity to detect out of order writes. An out of order write occurs when the communication adapter writes payloads to memory out of order in which the payloads are to be read from memory. For example, consider the scenario in which payload X logically precedes payload Y which logically precedes payload Z. In the example, a receiving process processes the payloads in memory order, namely, payload X, then payload Y, then payload Z. An out of order write occurs, for example, when the communication adapter writes either payload Y or payload Z without first writing payload X to memory. In the example, the writes are not in memory order (i.e., the order in memory such that contiguous subsequent payloads are written after preceding payloads). In one or more embodiments of the invention, the USN appended to the end of the sub-unit specifies the sequential order of the sub-units generated from the message, which allows the receiving entity to receive the sub-units of the message in any order (i.e., the sub-units do not have to be received and consumed in memory order). In this case, the USN allows the receiving entity to reassemble the message based on the order defined by the USN's of the sub-units, which allows out of order sub-units to be used rather than ignored.

Further, because the initial USN is appended to the initial sub-unit, the receiving entity can confirm that the transmission of the initial sub-unit to the collect is complete when it is determined that the initial USN is completely received. Optionally, if a CRC is appended to the initial sub-unit rather than the USN, an expected USN may be used by the receiving system to initiate the receiving system's CRC generator. The expected USN may be determined incrementally when data for a new message is received. In other words, the procedure for generating USN's may be agreed upon in advance by the receiving communication adapter and the receiving entity such that the expected USN's may be determined by the receiving communication adapter when message storage is initiated. In this case, the receiving entity determines that the initial sub-unit is completely received when a CRC generated with the expected USN matches the CRC appended to the initial sub-unit.

Continuing with FIG. 7, in Step 713, a determination is made as to whether additional sub-units of the message are received. If there are no additional sub-units received, the process ends. If there are additional sub-units received, the workflow proceeds to repeat Steps 703-713 until all sub-units of the message have been received. In this case, the receiving communication adapter will continue to receive subsequent sub-units to the memory while notifying the receiving entity that previous sub-units are ready for consumption in parallel.

Figure 8:
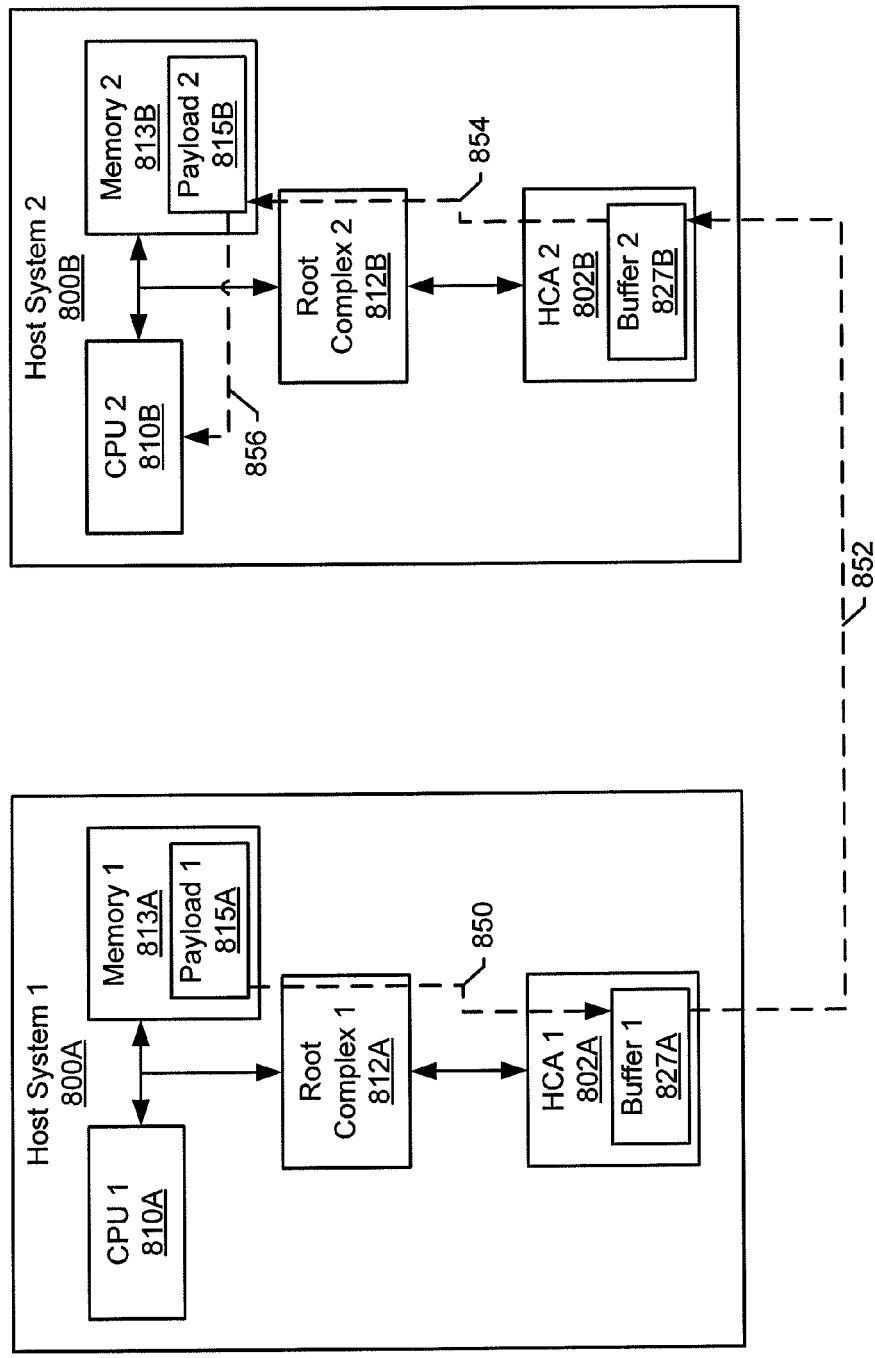
FIGS. 8-10 shows examples in one or more embodiments of the invention.

FIG. 8 shows an example in one or more embodiments of the invention. The following example is for explanatory purposes only and not intended to limit the scope of the invention. In the following example, consider the scenario in which two host systems (Host System 1 (800A), Host System 2 (800B)) are communicating over an Infiniband® network. Each host system includes a CPU (CPU 1 (810A), CPU 2 (810B)), memory (Memory 1 (813A), Memory 2 (813B)), a root complex (Root Complex 1 (812A), Root Complex 2 (812B)), and a host channel adapter (HCA 1 (802A), HCA 2 (802B)), where the arrows (850, 852, 854, 856) between the components of the host system show the flow of sub-units during the transmission of a message.

In FIG. 8, sub-units are initially transmitted (850) from Memory 1 (813A) of Host System 1 (800A) to HCA 1 (802A). Specifically, the sub-units are transmitted (850) from Payload 1 (815A) through Root Complex 1 (812A) to Buffer 1 (827A) in preparation of transmission to the Infiniband® network. The transmission from Memory 1 (813A) to Buffer 1(827A) corresponds to Steps 606 and 611 of FIG. 6 above.

Next, sub-units are transmitted (852) from HCA 1 (802A) of Host System 1 (800A) to HCA 2 (802B) of Host System 2 (800B). Specifically, the sub-units are transmitted (852) from Buffer 1 (827A) of Host System 1 (800A) via the Infiniband® network to Buffer 2 (827B) of Host System 2 (800B). The transmission from HCA 1 (802A) to HCA 2 (802B) corresponds to Step 609 of FIG. 6 above.

At this stage, sub-units are transmitted (854) from HCA 2 (802B) of Host System 2 (800B) to Memory 2 (813B). Specifically, the sub-units are transmitted (854) from Buffer 2 (827B) of Host System 2 (800B) via Root Complex 2 (812B) to Payload 2 (815B). The transmission from HCA 2 (802B) to Memory 2 (813B) corresponds to Steps 705 and 709 of FIG. 7 above.

Finally, sub-units are transmitted (856) from Memory 2 (813B) of Host System 2 (800B) to CPU 2 (810B). Specifically, the sub-units are consumed (856) from Payload 2 (815B) of Host System 2 (800B) by the CPU 2 (810B) after CPU 2 (810B) is notified that the stored sub-units are ready for consumption. The notification to the CPU 2 (810B) corresponds to Step 711 of FIG. 7 above.

Each of the four different stages of transmission discussed above (850, 852, 854, 856) may be performed by the host systems in parallel. As the MTU size of the sub-units is reduced, the overall time required to transmit a message is reduced because the transmissions are performed in parallel; however, the throughput is decreased due to the increased data transfer required for the additional headers of the sub-units.

FIGS. 9A-9E shows examples in one or more embodiments of the invention. The following examples are for explanatory purposes only and are not intended to limit the scope of the invention.

In FIG. 9A, a graph depicting the transmission of a message over four stages using the full path MTU. The stages (902A, 904A, 906A, 908A) are the same as the transmission stages (850, 852, 854, 859), respectively, discussed above with respect to FIG. 8. Only a single sub-unit is transmitted in each of the transmission stages (902A, 904A, 906A, 908A) because the size of the message is less than or equal to the full path MTU. As shown in FIG. 9A, the overall transmission time is four times the amount of time required to transmit the entire message because the transmissions cannot performed in parallel. The completion notification (904) is sent after the message is completely transmitted (909A) to the memory of the receiving system, after which a notification is sent to the CPU that the stored sub-unit is ready to be consumed.

In FIG. 9B, a graph depicting the transmission of a message over the four stages using a reduced MTU is shown in accordance with one or more embodiments of the invention. For example, FIG. 9B is an example transmission when the flowchart of FIGS. 3 and 6 are performed for a message in one or more embodiments of the invention. The stages (902B, 904B, 909B, 908B) are the same as the transmission stages (800, 802, 804, 809), respectively, discussed above with respect to FIG. 8. Because the reduced MTU is used, multiple sub-units are transmitted in each of the stages (902B, 904B, 906B, 908B). As shown in FIG. 9B, the overall transmission time is greatly reduced in comparison to FIG. 9A because transmissions are performed in parallel in each of the different transmission stages (902B, 904B, 906B, 908B). The completion notification (902) is still sent after the sub-unit is completely transmitted (906B) to the memory of the receiving system, after which a notification is sent to the CPU that the stored sub-unit is ready to be consumed.

In FIG. 9C, a graph depicting the transmission of a message over the four stages using a reduced MTU and completion code is shown. For example, FIG. 9C is an example transmission when the flowchart of FIGS. 3, 6, and 7 are performed for a message in one or more embodiments of the invention. The stages (902C, 904C, 906C, 908C) are the same as the transmission stages (800, 802, 804, 809), respectively, discussed above with respect to FIG. 8. Because the reduced MTU is used, multiple sub-units are transmitted in each of the stages (902C, 904C, 906C, 908C) in parallel. As shown in FIG. 9C, the overall transmission time is greatly reduced in comparison to FIG. 9A because transmissions are performed in parallel in each of the different transmission stages (902C, 904C, 906C, 908C). In addition, the overall transmission time is further reduced in comparison to FIG. 9B because a completion code is used to confirm the completion of each sub-unit, allowing the final stage (908C) to be performed in parallel with the previous stages (902C, 904C, 906C).

Figure 9D:
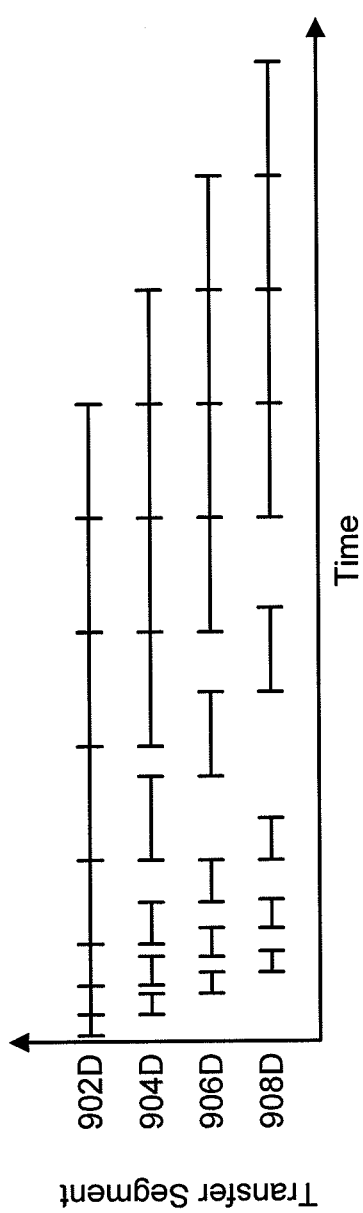

In FIG. 9D, a graph depicting the transmission of a message over the four stages with a ramp up of MTU. For example, FIG. 9C is an example transmission when the flowchart of FIGS. 4, 6, and 7 are performed for a message in one or more embodiments of the invention. The stages (902D, 904D, 906D, 908D) are the same as the transmission stages (800, 802, 804, 809), respectively, discussed above with respect to FIG. 8. Because the MTU is initially reduced and then ramped up, multiple sub-units are transmitted in each of the stages (902D, 904D, 906D, 908D) in parallel, optimized initially for reduced latency until the full path MTU is achieved, maximizing throughput. As shown in FIG. 9D, the overall transmission time is greatly reduced in comparison to FIG. 9A while still maintaining some of the throughput benefits of the full path MTU.

Figure 9E:
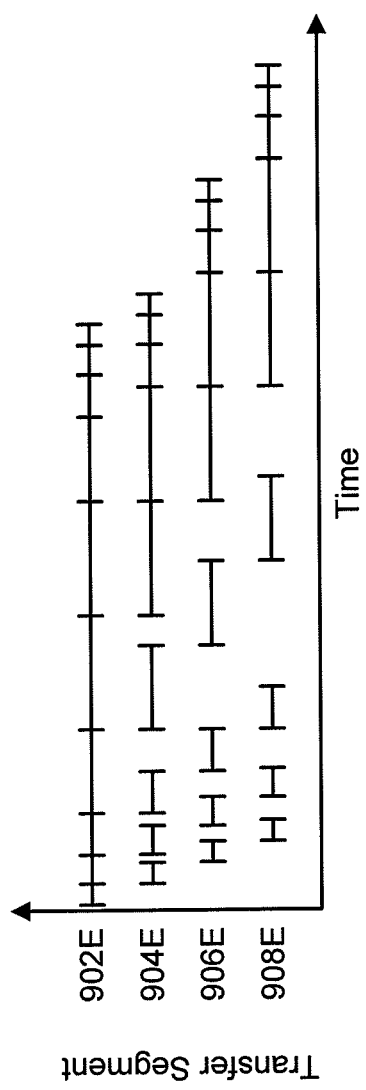

In FIG. 9E, a graph depicting the transmission of a message over the four stages with a ramp up and ramp down of MTU. For example, FIG. 9C is an example transmission when the flowchart of FIGS. 4, 6, and 7 are performed for a message in one or more embodiments of the invention. The stages (902E, 904E, 906E, 908E) are the same as the transmission stages (800, 802, 804, 809), respectively, discussed above with respect to FIG. 8. Because the MTU is ramped up and then ramped down, multiple sub-units are transmitted in each of the stages (902E, 904E, 906E, 908E) in parallel, optimized initially for reduced latency until the full path MTU is achieved, and then reducing latency again as the message winds down. As shown in FIG. 9E, the overall transmission time is greatly reduced in comparison to FIG. 9A while still maintaining some of the throughput benefits of the full path MTU.

Figure 10:
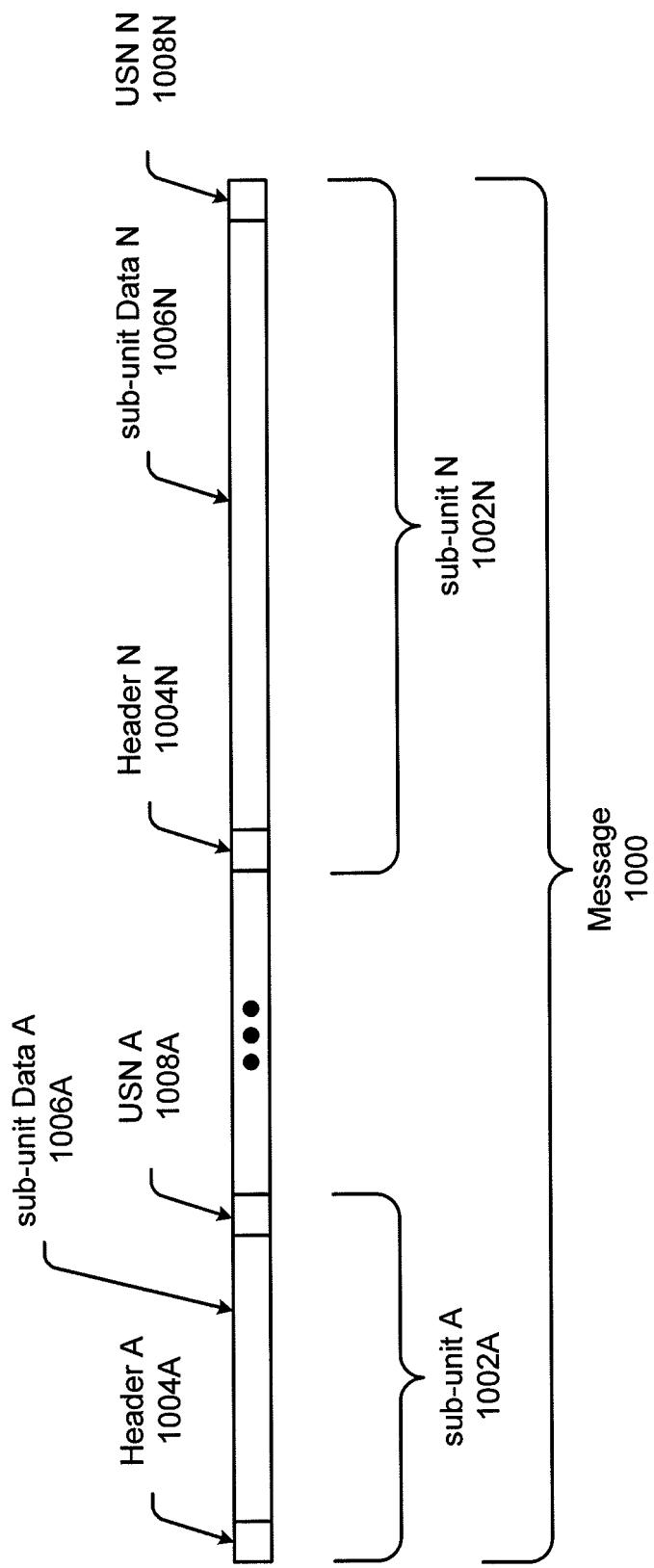

FIG. 10 shows an example in one or more embodiments of the invention. The following example is for explanatory purposes only and is not intended to limit the scope of the invention.

In FIG. 10, a message (1000) including multiple sub-units (1002A, 1002N) is shown. Each sub-unit (1002A, 1002N) in the example includes a sub-unit header (1004A, 1004B), sub-unit data (1006A, 1006B). The sub-unit header may be encrypted to include the MTU used to generate the corresponding sub-unit.

As discussed above, Sub-unit A (1002A) is generated using a reduced MTU causing the Header A (1004A) to be proportionally larger with respect to Sub-unit A (1002A). However, the reduced MTU causes a reduced latency to transmit the message. In contrast, Sub-unit N (1002N) is generated using a full path MTU to increase throughput, where a larger proportion of data transmitted in each sub-unit is actual sub-unit data.

Continuing with the example, as each sub-unit is received by the receiving communication adapter, the receiving communication adapter appends a USN (1008A, 1008B) to the Sub-units as shown in FIG. 10. Because USN A (1008A) is appended to Sub-unit A (1002A), confirmation of a completed transmission of Sub-unit A (1008A) may be confirmed when USN A (1008A) is completely stored. Thus, the receiving entity may begin processing the Sub-unit A (1002A) without waiting for the entirety of the message, such as Sub-unit N (1002N) to be received and stored into memory.

Embodiments of the invention may be implemented on virtually any type of computer regardless of the platform being used. For example, a computer system may include one or more processor(s) (e.g., an integrated circuit, central processing unit, or other hardware processor), associated memory (e.g., random access memory (RAM), cache memory, flash memory, etc.), a storage device (e.g., a hard disk, an optical drive such as a compact disk drive or digital video disk (DVD) drive, a flash memory stick, etc.), and numerous other elements and functionalities typical of today's computers (not shown). The computer system may also include input means, such as a keyboard, a mouse, or a microphone (not shown). Further, the computer system may include output means, such as a monitor (e.g., a liquid crystal display (LCD), a plasma display, or cathode ray tube (CRT) monitor). The computer system may be connected to a network (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms, now known or later developed. Generally speaking, the computer system includes at least the minimal processing, input, and/or output means necessary to particularly practice embodiments of the invention.

Further, those skilled in the art will appreciate that one or more elements of the aforementioned computer system may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a non-transitory computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for transmitting a message, the method comprising:
    receiving, by a collect buffer unit of a host channel adapter (HCA), from a transmitting device, a request to send the message;
    temporarily storing, by a virtual kick module of the HCA, the request once the request is received;
    obtaining, by a queue pair fetch module of the HCA, a queue pair status information corresponding to the request;
    obtaining, by a direct memory access (DMA) module of the HCA, the message from a location in memory of the transmitting device, wherein the location is specified in the request;
    modifying a maximum transfer unit (MTU) to obtain a modified MTU;
    transmitting, from the HCA to a receiving system, a first sub-unit of the message using the modified MTU;
    iteratively increasing the MTU for transmitting a plurality of intermediate sub-units of the message until an MTU limit is reached;
    transmitting, to the receiving system, the plurality of intermediate sub-units of the message, wherein the plurality of intermediate sub-units are transmitted after the first sub-unit and before a second sub-unit; and
    transmitting, from the HCA to the receiving system, the second sub-unit to the receiving system using a full path MTU.

2. The method of claim 1, further comprising:
    after transmitting the second sub-unit, iteratively decreasing the maximum transfer unit (MTU) for transmitting a plurality of remaining sub-units of the message.

3. The method of claim 1, further comprising:
    selecting the modified MTU to use for the transmission of the message based on a size of the message.

4. The method of claim 1, wherein the full path MTU is greater than the modified MTU, the method further comprising:
    for each subsequent sub-unit of the message, selecting a selected MTU from a group consisting of the modified MTU and the full path MTU to transmit the subsequent sub-unit of the message.

5. The method of claim 1, wherein the receiving system uses stateful ingress filtering to deteimine the modified MTU of the first sub-unit on a per request basis.

6. The method of claim 1, wherein the modified MTU is encoded into the first sub-unit.

7. A non-transitory computer readable medium storing instructions for transmitting a message, the instructions comprising functionality to:
    receive, by a collect buffer unit of a host channel adapter (HCA), from a transmitting device, a request to send the message;
    temporarily store, by a virtual kick module of the HCA, the request once the request is received;
    obtain, by a queue pair fetch module of the HCA, a queue pair status information corresponding to the request;
    obtain, by a direct memory access (DMA) module of the HCA, the message from a location in memory of the transmitting device, wherein the location is specified in the request;
    modify a maximum transfer unit (MTU) to obtain a modified MTU;
    transmit, to a receiving system, a first sub-unit of the message using the modified MTU;
    iteratively increase the MTU for transmitting a plurality of intermediate sub-units of the message until an MTU limit is reached;
    transmit, from the HCA to the receiving system, the plurality of intermediate sub-units of the message, wherein the plurality of intermediate sub-units are transmitted after the first sub-unit and before a second sub-unit; and
    transmit, from the HCA to the receiving system, the second sub-unit to the receiving system using a full path MTU.

8. The non-transitory computer readable medium of claim 7, wherein the instructions further comprise functionality to:
    after transmitting the second sub-unit, iteratively decrease the maximum transfer unit (MTU) for transmitting a plurality of remaining sub-units of the message.

9. The non-transitory computer readable medium of claim 7, wherein the instructions further comprise functionality to:
    select the modified MTU to use for the transmission of the message based on a size of the message.

10. The non-transitory computer readable medium of claim 7, wherein the modified MTU is encoded into the first sub-unit.

11. The non-transitory computer readable medium of claim 7, wherein the full path MTU is greater than the modified MTU, the instructions further comprise functionality to:
    for each subsequent sub-unit of the message, selecting a selected MTU from a group consisting of the modified MTU and the full path MTU to transmit the subsequent sub-unit of the message.

* * * * *

UNITED STATES PATENT AND TRADEMARK OFFICE
CERTIFICATE OF CORRECTION

Page 1 of 1

PATENT NO.      : 9,118,597 B2
APPLICATION NO. : 14/449027
DATED           : August 25, 2015
INVENTOR(S)     : Bugge et al.

It is certified that error appears in the above-identified patent and that said Letters Patent is hereby corrected as shown below:

Specification

In column 3, line 47, delete "machines" and insert -- machines. --, therefor.

In column 14, line 39-44, delete "System 2 (800B) to CPU 2 (810B). Specifically, the sub-units are consumed (856) from Payload 2 (815B) of Host System 2 (800B) by the CPU 2 (810B) after CPU 2 (810B) is notified that the stored sub-units are ready for consumption. The notification to the CPU 2 (810B) corresponds to Step 711 of FIG. 7 above." and insert the same on col. 14, line 38, after "Host" as a continuation of paragraph.

Claims

In column 18, line 2, in claim 5, delete "deteimine" and insert -- determine --, therefor.

Signed and Sealed this
Twenty-first Day of June, 2016

Michelle K. Lee
*Director of the United States Patent and Trademark Office*